April 27, 1937. E. C. GRAYSON ET AL 2,078,379
MOBILE APPARATUS FOR ICING REFRIGERATOR VEHICLES
Filed Sept. 25, 1935 4 Sheets-Sheet 2
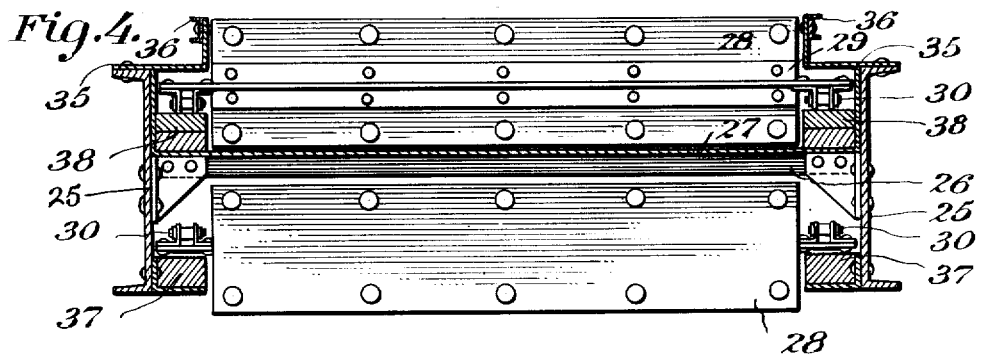
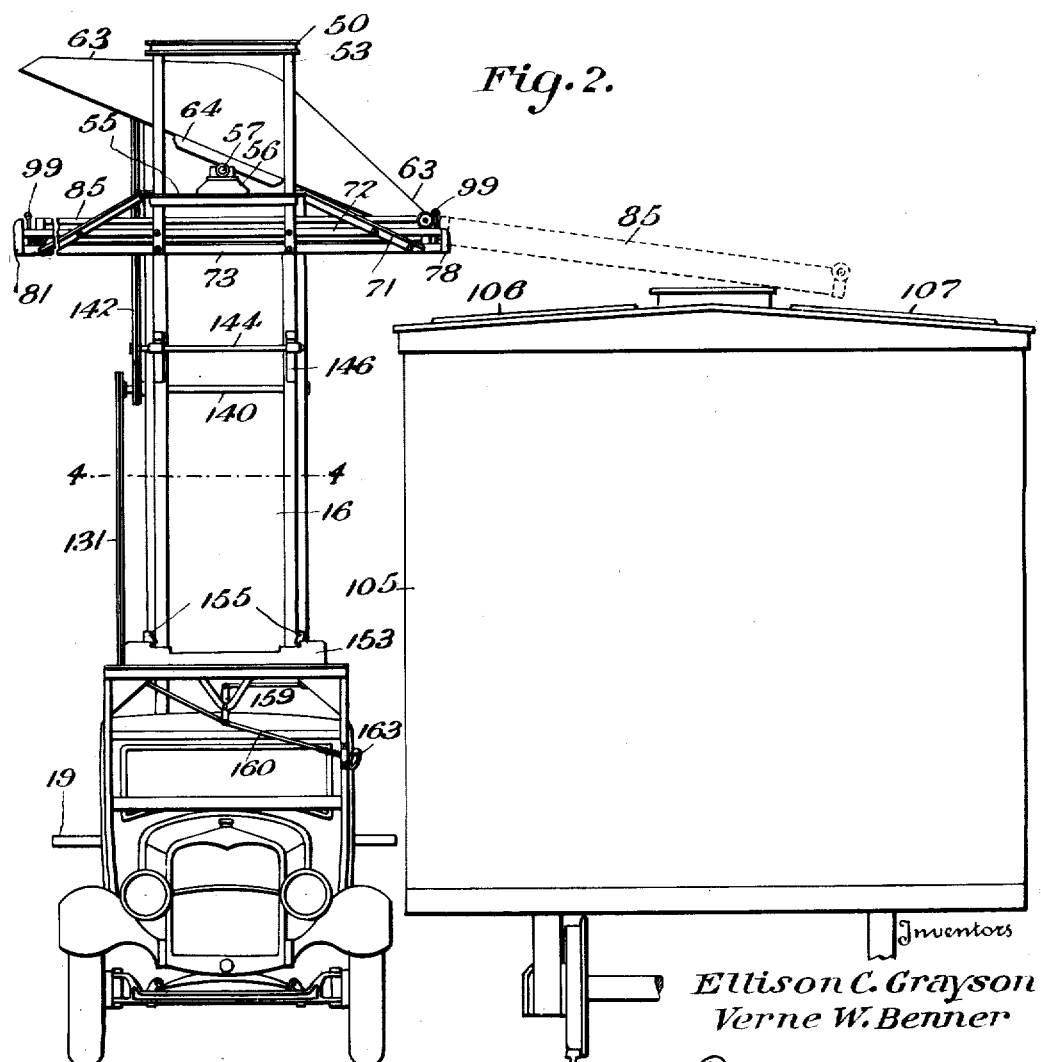
Inventors
Ellison C. Grayson
Verne W. Benner
Attorney April 27, 1937.  E. C. GRAYSON ET AL  2,078,379
MOBILE APPARATUS FOR ICING REFRIGERATOR VEHICLES
Filed Sept. 25, 1935  4 Sheets-Sheet 3
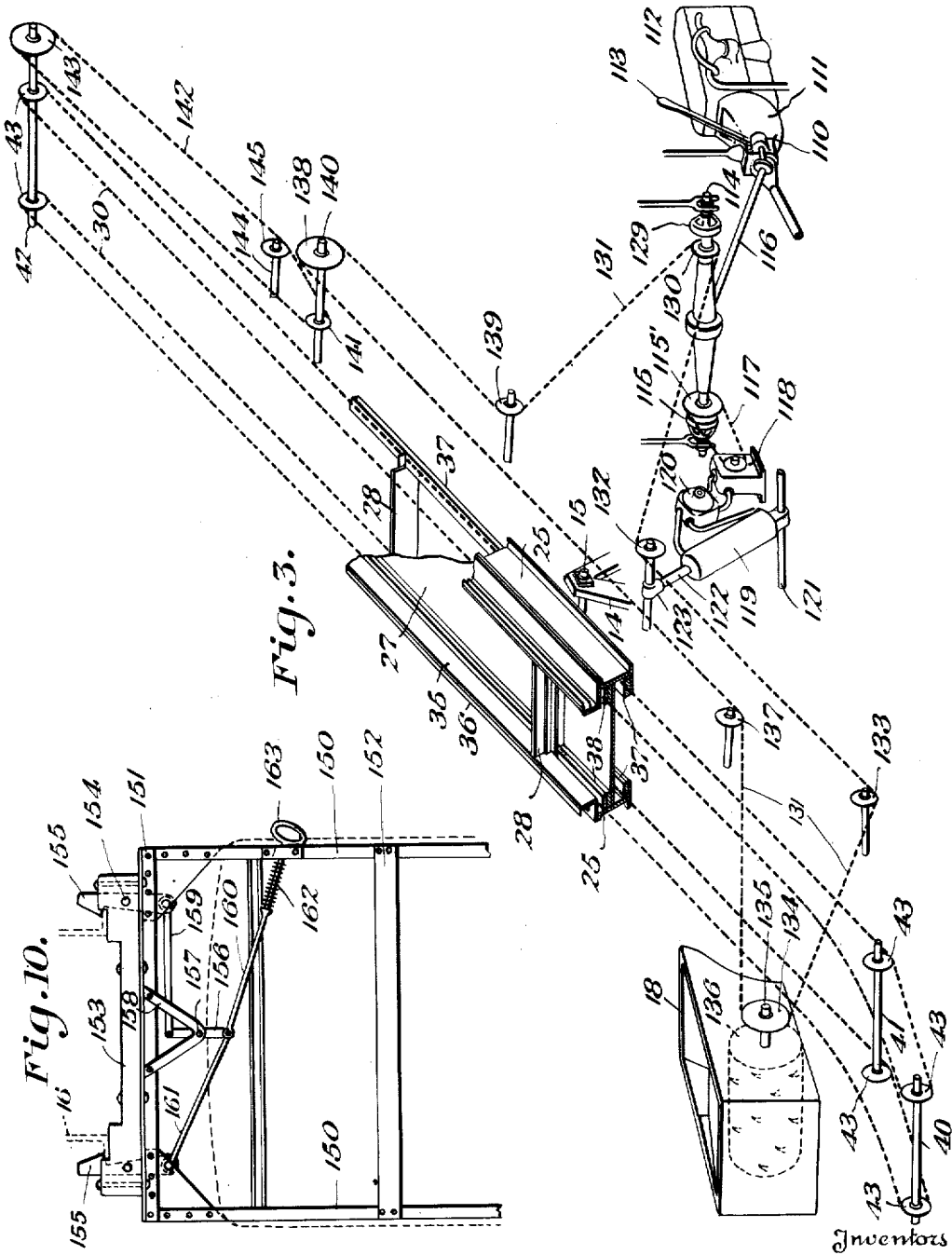
Inventors
Ellison C. Grayson
Verne W. Benner April 27, 1937.  E. C. GRAYSON ET AL  2,078,379
MOBILE APPARATUS FOR ICING REFRIGERATOR VEHICLES
Filed Sept. 25, 1935  4 Sheets-Sheet 4
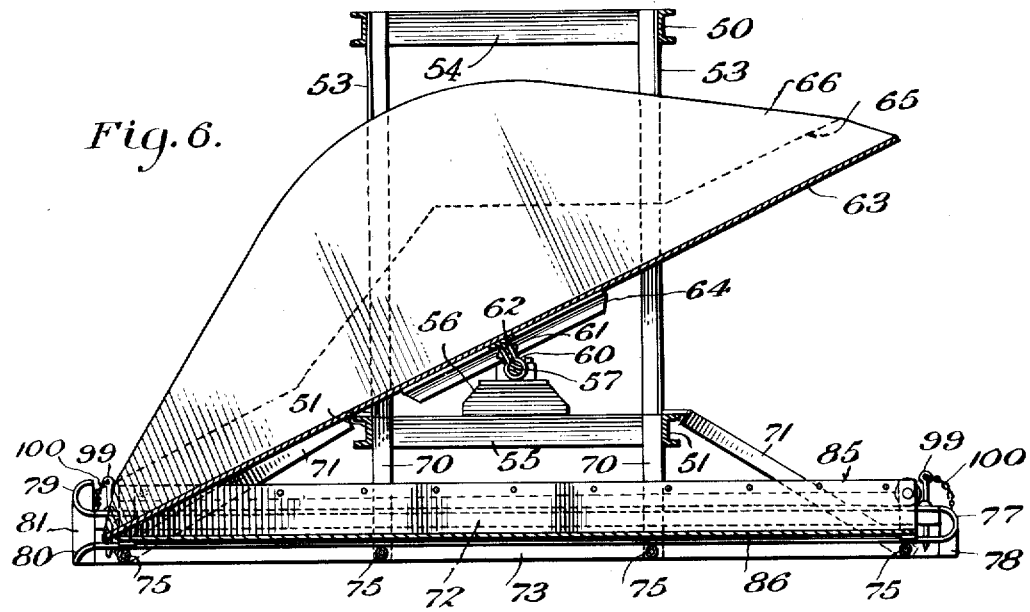
Inventors
Ellison C. Grayson
Verne W. Benner Patented Apr. 27, 1937

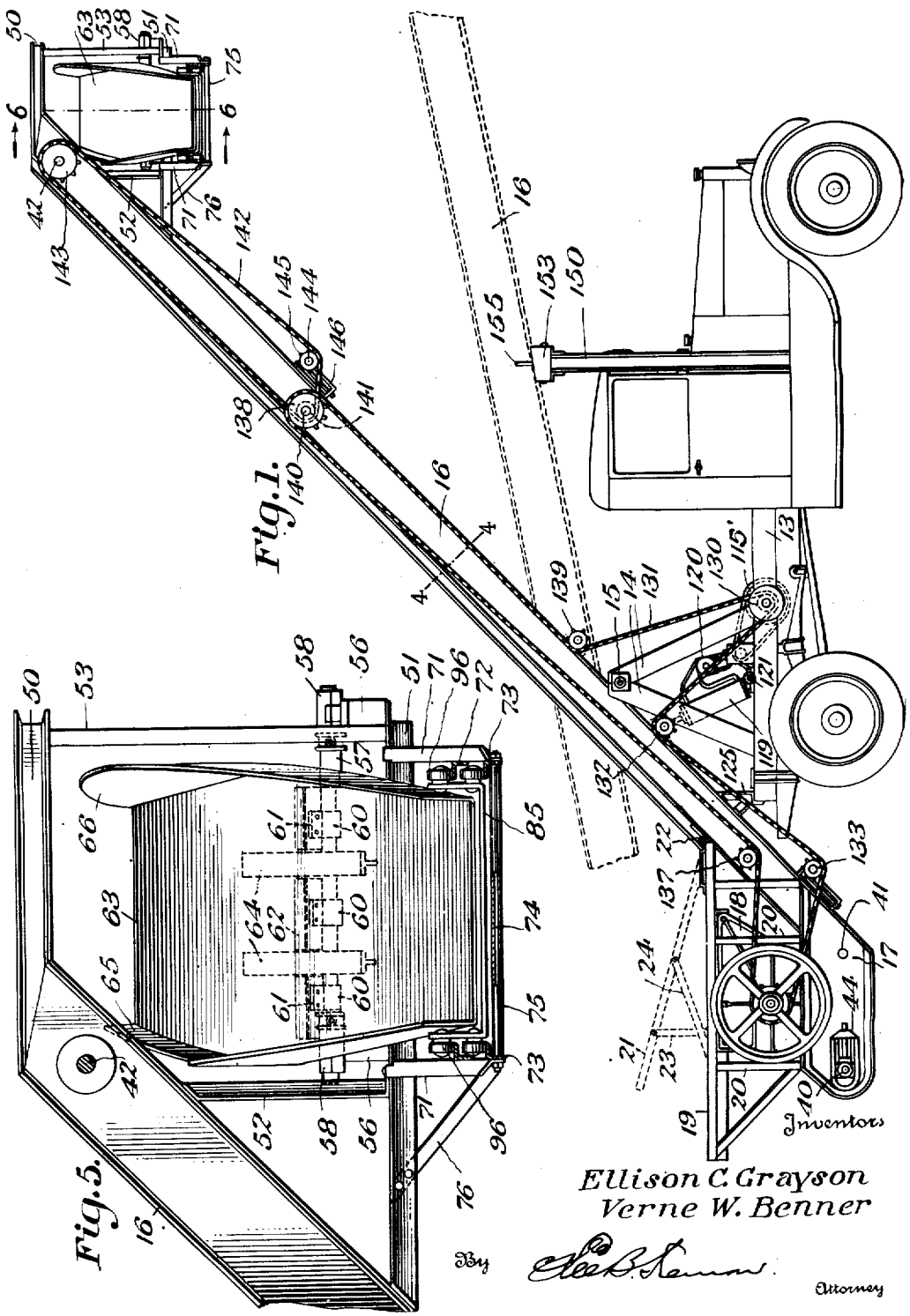

2,078,379

UNITED STATES PATENT OFFICE 2,078,379

MOBILE APPARATUS FOR ICING REFRIGERATOR VEHICLES

Ellison C. Grayson and Verne W. Benner, St. Paul, Minn.

Application September 25, 1935, Serial No. 42,093

11 Claims. (Cl. 83—63)

This invention relates to improvements in mobile equipment for icing refrigerator cars and other vehicles, and particularly to a portable or automotive machine by which ice may be conveniently and rapidly delivered directly to the ice bunkers of refrigerator cars. The ice so delivered may be either crushed or uncrushed, but the equipment is especially designed to be used to deliver crushed ice to vehicles of the type named.

While the embodiment of the invention herein illustrated is intended primarily for icing railway refrigerator cars, it is intended to disclose that the invention is equally applicable to the icing of motor trucks, trailers or the like, for use in refrigerated transport service generally.

Heretofore, refrigerator cars have been supplied with ice from ice storage houses to which each refrigerator car is moved, stopped, iced, and then moved on. It has been proposed to use ice handling apparatus mounted for movement on the same track on which the refrigerator cars are located; and it has also been known to provide ice handling equipment which is moved to the side of a refrigerator car and operated to transfer block ice from such equipment to the ice bunkers of the refrigerator car.

It is the object of this invention to provide an improved portable machine which will elevate and deliver either crushed or uncrushed ice as desired to the ice chambers, or bunkers of refrigerated vehicles.

It is a further object of this invention to provide a mobile unit adapted to receive block or cake ice, crush the ice, elevate the crushed ice, and deliver it to the ice chambers or bunkers of refrigerator cars and the like.

It is a still further object of this invention to provide an improved ice handling unit which is automotive and which may be driven, as an ordinary motor vehicle, to each of a series of cars or vehicles to be iced.

Another object of the invention is to provide a device for icing refrigerator cars which embodies a folding or collapsing structure, and which therefore may be more easily transported than devices of this nature formerly known and used, and which is more efficient in operation.

Other objects and advantages of the invention will be apparent from the following detailed description of an embodiment of the invention, shown in the accompanying drawings, wherein:

Figure 1 is a side elevation view of a preferred form of the complete ice handling unit with the lowered position of the elevator during movement of the unit from one vehicle to another indicated by dotted lines.

Figure 2 is a front end view of the unit shown in Figure 1 showing the elevator positioned to deliver ice to the hatch over the ice bunker of a refrigerator car.

Figure 3 is a schematic view showing the principal parts of the drive mechanism including a view of a section of the elevator.

Figure 4 is a transverse section view of the elevator along line 4—4 of Figures 1 and 2.

Figure 5 is an enlarged side view of the top of the elevator showing the ice delivery mechanism.

Figure 6 is a vertical transverse section along line 6—6 of Figure 1.

Figure 7 is an enlarged partial section on the same line showing the position of the delivery mechanism for discharge to one side of the elevator.

Figure 8 is a similar view showing the parts in position for discharge to the opposite side of the elevator.

Figure 9 is a plan view of the slidable delivery chutes, and

Figure 10 is a front view of the latch mechanism for holding the elevator in its lowered, inoperative position.

Referring to Figure 1 of the drawings, the preferred embodiment of the invention is illustrated as comprising an automobile truck chassis, indicated by numeral 13, although an ordinary wheeled truck adapted to be drawn by a separate motor vehicle may be used. Rigid supports 14 are mounted on the chassis near the rear thereof for carrying a transverse shaft 15, on which an inclined elevator 16 is pivotally supported. The elevator 16 is preferably of the endless chain or conveyor type, and is described more fully hereinafter.

The lower end 17 of the inclined elevator 16 is enlarged and extended, to provide support for an ice crusher 18. An ice receiving platform 19 is supported on top of the crusher 18. Additional upright supports 20 are provided for the ice receiving platform. A trap door 21, pivoted at 22, and shown in raised position by dotted lines in Figure 1, is provided on the ice receiving platform 19 directly above the ice crusher 18. When in the down position, the trap door is substantially even with the surface of the platform 19, in order that ice delivered to the device may pass over the ice crusher directly to the elevator 16. The trap door, when in raised position, allows ice to pass to the crusher, where it is crushed before delivery to the elevator 16. Members 23 and 24 support the trap door 21 in its raised position, and aid in guiding ice into the crusher 18.

The elevator 16 may be of any suitable construction, but it is preferably of the endless chain-conveyor type shown, and comprises (see Figures 3 and 4) two longitudinal beams 25, connected by transverse braces 26 which support the inclined trough or guideway 27. Pusher bars 28 attached to members 29 are driven along the guideway 27 by endless chains 30. Longitudinal members 35 having their upper edges reinforced by channel members 36 are attached to the upper side of beams 25, and enclose the top of chain 30. The members 35 also serve to increase the effective depth of inclined guideway 27. Longitudinally extending members 37 and 38 support the endless chains 30 between the ends of the elevator. Transverse shafts 40 and 41 journaled in the lower end 17 of the elevator, and shaft 42 journaled on the top of the elevator carry pairs of chain sprockets 43, around which the endless chains 30 operate. A takeup device 44 (see Figure 1) is provided to remove the slack from the elevator chains 30 by moving the sprocket shaft 40 rearwardly.

Ice delivery mechanism is carried at the upper end of the inclined elevator for directing the ice, crushed or uncrushed, from the upper end of the elevator into conventional roof hatches above the ice bunkers of the vehicles to be iced. The delivery mechanism consists of a tiltable delivery table 63, and a movable ice chute 85, the details of which are illustrated in Figures 5-9 inclusive.

The delivery mechanism is supported in a structural framework including horizontal members 50 and 51 secured to the elevator by welding, riveting, or the like, and connected together by suitable vertical members 52 and 53 and transverse members 54 and 55. The delivery table 63 is supported on the shaft 57 by means of sleeves 60 having flanges 61 secured to angle members 62 fastened on the under side of the delivery table. Bracing members 64 are also secured to the under side of the tiltable table to reenforce the same. The shaft 57 is supported in journals 58 carried by members 56 fastened to the frame members 55.

The ice delivery table 63 is provided with upwardly extending sides 65 and 66. Side 65, the relative size and outline of which is indicated by dotted lines in Figure 6, is shaped or cut away to permit ice to be discharged from the end of elevator 16 onto the table. Side 66 is sufficiently high to intercept the discharge of ice from the end of the elevator 16 and to direct it outwardly to one or the other end of the delivery table 63. The floor of the table 63 is widest at the center where the discharge from the elevator is received, and tapers to somewhat narrower discharge or delivery ends. The table 63 pivots on shaft 57 for delivering ice to either side of the machine, at the will of the operator. Members 51 which form part of the frame limit the pivoting movement of the table.

Suspension members 70, and braces 71 attached to members 51, extend below the delivery mechanism frame to support two pairs of track rails or guideways 72 and 73, preferably of angle iron section. Rods 74, carrying spacing sleeves 75, maintain the tracks at the desired width or gauge, and secure the track rails 73 to the lower ends of suspension members 70 and braces 71. Braces 76, forming angular connections with the frame members 51 provide additional strength and rigidity to the rail supporting structure. At one end, (see Figure 8) the track rails 72 and 73 are connected by a semi-circular section 77, attached to the face of supporting members 78 and preferably welded to the ends of track rails 72 and 73. At the opposite end (see Figure 7), the track rails 72 are extended upwardly in a semi-circular arc, and track rails 73 are extended downwardly, in an arc, by the curved sections 79 and 80 respectively, attached to the face of a supporting member 81 and also preferably welding to track rails 72 and 73.

A delivery chute 85 is mounted for sliding movement on tracks 72 and 73, which chute is preferably constructed with a flat rectangular bottom 86 and upturned sides 87, the latter having edge reenforcing members 88. Metal reenforcement straps 89 and 90 are attached to the end edges of the chute. Rollers 95 and 96 are mounted on stub axles 97 and 98, rollers 95 being mounted near the bottom 86 of one end of the chute on strap 89, and rollers 96 near the upper edges of the chute sides 87 on strap 90, at the opposite end of the chute. Rollers 95 operate on the lower track 73, and rollers 96 on the upper track 72. If the chute is positioned to the right, as shown in Figure 8, rollers 95 engage the semi-circular track section 77, which limits the outward movement of the chute, and prevents separation of the chute from its supporting frame. The end track section 77 is so positioned that the sliding movement of the chute is checked with the edge of the chute immediately below the edge of the table 63, and in order that the chute 85 may be swung slightly downward, the stub axles 97 serve as a pivot, permitting the chute to assume the inclined position shown in Figures 2 and 8.

When the chute 85 is moved in the opposite direction, rollers 96 engage curved track sections 79 which latter check the sliding movement and permit the chute to swing or pivot on stub axles 98 to the position shown in Figure 7. Pins 99, attached to the frame by chains 100 may be inserted through suitable openings in the tracks to retain the chute in horizontal carrying position beneath the table 63. The pins at one end of the chute are removed when it is desired to draw the chute to its extended delivery position.

When the device is positioned, e. g., beside a refrigerator car 105, as shown in Figure 2, the length of the delivery table is sufficient to permit the tilted table to discharge directly into the near hatch 106. The chute 85 is intended to be used to deliver ice to the hatch 107 on the far side of the refrigerator car, or to the near hatch when roadway conditions do not permit the device to be close to the vehicle to be iced.

Referring now to Figure 3, a power take-off mechanism 110 is associated with the transmission gear 111 of truck motor 112, to which it may be operatively connected by means of gear shift lever 113. The take-off mechanism 110 supplies power to a transverse shaft 114, mounted on truck chassis 15 through a drive shaft 116. A separate motor may be mounted on the vehicle chassis 13 and used instead of the vehicle motor for operating shaft 114.

A clutch 115 at one end of shaft 114 operatively connects sprocket 115' to shaft 114 to drive an oil pump 118 through chain drive 117. The oil pump delivers oil under pressure to either end of a cylinder 119, depending on the adjustment of the valve mechanism 120. The valve mechanism may be embodied in the pump structure or separately as shown in the drawings. The cylinder 119 is pivotally mounted on shaft 121 journaled on the truck chassis. A piston and piston rod 122 are arranged for operation in cylinder 119, and the piston rod has its outer end pivotally attached, at 123, to a shaft, carried by the elevator at one side of its pivotal support 15. When valve 120 is adjusted to supply oil under pressure to the upper end of cylinder 119, piston 122 is forced downwardly to raise the delivery end of the elevator 16, by pivotal movement of the entire elevator about shaft 15. When oil, under pressure, is supplied to the lower end of the cylinder, the elevator is lowered to the position indicated by dotted lines in Figure 1. A bracket 125 (see Figure 1), attached to the elevator, rests on the truck chassis when the device is in operative position, and this bracket serves to limit the maximum inclination of the elevator.

A second clutch 129, at the opposite end of shaft 114, operatively connects sprocket 130 for driving the endless chain or belt 131. This chain passes over an idler sprocket 132, then downwardly under idler 133, and thence around sprocket 134 on shaft 135 for operating the crushing roll 136. Chain 131 then passes under idler 137, over sprocket 138, over idler 139 and back to sprocket proper 130. Idler 133 is adjustably mounted on the elevator 16 to permit proper tensioning of chain 131. Sprocket 138 drives a shaft 140 journaled on the elevator 16 and carrying a sprocket 141. A chain or belt 142 passes around the latter sprocket and around a sprocket 143 at the upper end of the elevator to supply power to a shaft 42 from which the elevating chains are driven. Shaft 144 carrying idler 145 is adjustably mounted on elevator 16 with movable journals 146 for tensioning chain 142.

Idlers 132 and 139 are spaced an equal distance from shaft 15. When the inclination of the elevator is changed, one of the idlers moves away from the shaft 114 by the same distance that the other approaches the shaft. In this manner the elevator may be pivoted about shaft 15 without producing slack in chain 131 and the power supplying means will be operable in any inclined position of the elevator.

Standards 150 mounted on the front of chassis 15 are connected by cross members 151 and 152 as shown in Figure 10. Member 153 attached to the top of cross member 151 serves as a buffer or stop defining the lowest position to which the elevator 16 may be lowered. Latches 155, mounted on pivots 154 are provided for retaining the elevator 16 in lowered position. A lever 156, pivoted at 157 on the brace 158, is connected to latches 155 by members 159 and 161 respectively. A rod 160 is attached to lever 156 and provided with a handle 163. Spring 162 extending between a collar on the rod 160 and the member 150 tends to keep the latches engaging the elevator 16 in the position shown in Figure 10 until released by pulling outwardly on handle 163. When the elevator is swung downwardly against member 153 the latches are forced outwardly and then snap into latching position automatically to secure the elevator until they are opened manually by operation of the handle 163.

The operation of the above-described preferred form of ice handling apparatus for supplying crushed ice to the ice bunkers of a railway or other refrigerator vehicle is as follows:

The unit is driven to a position adjacent and approximately parallel to the car or truck to be iced, as shown in Figure 2. The elevator 16 should be in the raised position shown so that the edge of the tilted delivery table 63 slightly overhangs the edge of the adjacent hatch 106 in the car roof above the ice bunker. A truck containing block ice is backed up to the rear of the ice handling unit, so that the truck platform is adjacent the ice receiving platform 19 of the handling unit. The trap door 21 is raised and the block ice cut into cakes weighing 50 to 100 pounds each. The crushing and elevator mechanisms are now put into operation by engaging the clutch 129. The cakes of ice are then fed through the trap door 21 into the crusher 18, where they are crushed to the desired fineness depending on the adjustment of the crusher. The crushed ice falls from the bottom of the crusher 18 onto the elevator trough 27 where it is engaged by the driven pusher bars 28 which convey the crushed ice up the incline to the top of the inclined elevator. The crushed ice is moved over the top of the elevator trough 27 by the pusher bars and falls onto the tilted delivery table 63 from which it slides into the car hatch 106.

When it is desired to supply ice to a bunker on the far side of a car, the chute 85 is drawn from its position under the delivery table 63 to an extended position shown dotted in Figure 2, overhanging the hatch 107. The mounting of the chute 85 permits it to be drawn to the extended position without interrupting the continuous delivery of ice to the vehicle bunkers. When in this position, ice delivered to the tilted table 63 slides into the chute 85 and thence into the hatch 107. Salt or the like may be added to the ice, as it is discharged into the bunkers, for assisting refrigeration.

It will be noted that the tiltable delivery table permits the ice handling unit to be operated on either side of a car to be iced or to be operated between cars. The sliding delivery chute may be extended on either side of the unit to increase its range of use.

Where chunk icing is preferred, the trap door 21 is kept closed, and chunks of ice fed directly over the platform 19 to the elevator without crushing. The pusher bars convey the ice chunks or cakes up the elevator to the delivery table in the same manner as for crushed ice.

After an ice bunker or several bunkers have been supplied with the desired amount of ice, the ice handling apparatus may be moved or driven to another car or cars to be iced. Where the unit is to be moved a relatively great distance or through surroundings having low overhead clearance, the elevator will be lowered until it rests on the supporting member 153 and is secured by the latches 155. Suitable manipulation of the valve 120 and the clutch 115 admits oil under pressure to the cylinder 119 and piston 122 for lowering or raising the elevator as desired.

It will be observed that with the use of the above described equipment, the icing of refrigerator cars may be rapidly and efficiently accomplished. Thus, a train of refrigerator cars may be completely iced without the necessity of "spotting" each car at a definite position for individual icing. Frequently a train of cars includes some cars which require the use of crushed ice for refrigeration and some in which chunk ice is desired, or a combination of chunk and crushed ice. The equipment described can deliver either chunk or crushed ice at the will of the operator. The crushed ice reaches the bunkers immediately after crushing, and thereby losses due to melting are minimized.

It will be understood that various changes in the size, shape, proportion and minor details of construction may be resorted to without sacrificing any of the advantages or departing from the herein described invention.

What is claimed is:

1. In mobile apparatus for supplying ice to the bunkers of refrigerator vehicles, the combination comprising, a vehicle chassis having a source of power thereon, an inclined elevator pivotally supported intermediate its ends on said chassis, ice receiving means carried by and aligned with the lower end of said pivoted elevator, ice delivery means carried by and aligned with the opposite end of said pivoted elevator, means operative from said source of power for changing the inclination of the entire elevator and the ice receiving and delivering means carried thereby to regulate the height of its delivery end, and driving means extending between said elevator and said source of power on said chassis for operating said elevator, said driving means being arranged concentrically with respect to the axis of the pivotal support of the elevator to permit changes in elevator inclination while maintaining an operative driving connection therewith.

2. In mobile apparatus for supplying crushed and/or cake ice to the bunkers of refrigerator vehicles, the combination comprising, a vehicle chassis having a source of power thereon, an inclined elevator pivotally supported intermediate its ends on said chassis, an ice crusher supported on the lower end of said elevator and having a discharge outlet for delivery of crushed ice to the conveying mechanism of said elevator, means carried by said crusher for directing cake ice to said crusher and to said elevator means on and aligned with the opposite end of said elevator, for directing the delivery of crushed and/or cake ice to the bunkers of said refrigerator vehicles, and driving means extending between said crusher, said elevator and said source of power for operating said crusher and elevator, said driving means being arranged with respect to the pivotal support of the elevator to permit changes in the inclination of the entire elevator and crusher carried thereby while maintaining an operative driving connection.

3. In mobile apparatus for supplying crushed and/or cake ice to the bunkers of refrigerator vehicles, the combination comprising, a vehicle chassis having a source of power thereon, a transverse shaft supported in an elevated position on said chassis, an inclined elevator pivotally supported intermediate its ends on said shaft, an ice crusher supported on the lower end of said elevator, an ice receiving platform at the upper side of said crusher, said platform having provision for receiving and delivery of ice to the crusher and to the elevator, ice delivery means on the upper end of said elevator for directing the delivery of cake and/or crushed ice to the bunkers of said refrigerator vehicles, and driving means extending between said crusher, said elevator and said source of power for operating said crusher and elevator, said shaft being adjacent the center of gravity of said elevator and the parts supported thereon, said driving means being arranged with respect to the pivotal support of the elevator to permit changes in the inclination of said elevator while maintaining an operative driving connection with said crusher and said elevator.

4. In mobile apparatus for supplying crushed and/or cake ice to the bunkers of refrigerator vehicles, the combination comprising, a vehicle chassis having a source of power thereon, an inclined elevator pivotally supported intermediate its ends on said chassis, an ice crusher supported on the lower end of said elevator, an ice receiving platform at the upper side of and carried by said crusher, said platform having an opening therein above the inlet of the crusher whereby cake ice received on said platform may be directed to said crusher, and a door for closing said opening whereby cake ice received on said platform may be delivered directly to said elevator, means driven by said source of power for changing the inclination of said elevator to regulate the height of its delivery end, and driving means extending between said crusher, said elevator and said source of power for operating said crusher and said elevator, said driving means being arranged with respect to the pivotal support of the elevator to permit changes in the inclination of said elevator while maintaining an operative driving connection with said crusher and said elevator.

5. In a mobile apparatus for elevating ice to the hatch of a refrigerator vehicle ice bunker, an ice delivery mechanism supported at the upper end of said apparatus and comprising, a delivery platform pivotally supported intermediate its ends for tilting toward either side of the apparatus, and a slidable delivery chute positioned in transverse guides carried by said mechanism beneath said platform, said chute being adapted to be extended to a position at either side of the apparatus for directing ice from said delivery platform to vehicle hatches beyond the reach of said tiltable platform.

6. In a mobile apparatus for elevating ice to the hatch of a refrigerator vehicle ice bunker, an ice delivery mechanism supported at the upper end of said apparatus and comprising, a delivery platform pivotally supported intermediate its ends for tilting toward either side of the apparatus, the said platform being of sufficient length to project over an adjacent refrigerator vehicle hatch, and a slidable delivery chute positioned in transverse guides carried by said mechanism beneath said platform, said chute being adapted to be extended to a position at either side of the apparatus for directing ice from said delivery platform to vehicle hatches beyond the reach of said platform.

7. In mobile apparatus for elevating and discharging ice into the hatch of a refrigerator vehicle ice bunker, an ice delivery mechanism carried by the upper end of said apparatus and comprising, a platform positioned for receiving ice discharged from the top of the elevating apparatus, the said platform being pivotally supported intermediate its ends for tilting toward either side of the apparatus and being of sufficient length to overhang the ice hatch of an adjacent refrigerator vehicle, horizontal guides carried by said mechanism beneath said platform, said guides being provided with stops at the ends thereof, and a delivery chute supported on rollers engaging said guides, said chute being adapted to be drawn to either side of the apparatus into engagement with the stops at one end of the guides and inclined downwardly for directing the discharge of ice from said tilted platform into the hatch of a refrigerator vehicle ice bunker.

8. In mobile apparatus for supplying crushed and/or cake ice to the bunkers of refrigerator vehicles, the combination comprising, a vehicle chassis having a source of power thereon for driving said apparatus, an inclined ice elevator pivotally supported on said chassis, an ice crusher supported on the lower end of said elevator and having a discharge outlet for delivery of crushed ice to the ice conveying mechanism of said elevator, an ice receiving platform supported above said crusher, said platform having an opening therein above the inlet of said crusher and a door for closing said opening, an ice delivery platform pivotally supported intermediate its ends at the upper end of said elevator for tilting toward either side of the apparatus, a slidable delivery chute positioned in transverse guides beneath said delivery platform, said chute being adapted to be extended to either side of the apparatus for directing ice from said delivery platform to the vehicle bunker, and means extending between said source of power on the chassis and the crusher and elevator for operating said crusher and elevator.

9. In mobile apparatus for elevating and discharging block and crushed ice into the icing hatch of a refrigerator vehicle ice bunker, the combination comprising, a mobile chassis and a source of power thereon, an inclined elevator supported on said chassis, an ice crusher supported on the lower end of said elevator, a block ice receiving platform on said crusher having an opening therethrough, said crusher and platform being arranged with respect to said elevator that some of the block ice received on said platform may be guided through said opening into said crusher for crushing and feeding to said elevator, and other block ice received on said platform may be guided thereacross directly onto said elevator, ice discharging means supported on the upper end of said elevator, and driving means connecting said elevator and said crusher with said source of power.

10. In mobile apparatus for elevating and discharging block and crushed ice into the icing hatch of a refrigerator vehicle ice bunker, ice discharging means supported on an elevated portion of said apparatus, said means comprising, a pivotally supported delivery table tiltable toward an icing hatch of a vehicle on either side of said apparatus, a pair of transverse guides supported beneath said tiltable delivery table, a discharge chute slidably arranged in said guides for movement toward either side of said apparatus, and stops secured to said guides engaging said chute when extended to either side of the apparatus to limit such movement while allowing the chute to be inclined downwardly away from said delivery table toward a hatch of a refrigerator vehicle.

11. In mobile apparatus for elevating and discharging block and crushed ice into the icing hatch of a refrigerator vehicle ice bunker, the combination comprising, a mobile chassis and a source of power thereon, an inclined elevator, pivotally supported intermediate its ends on said chassis, block ice receiving end crushing means secured on the lower end of said pivotally supported elevator, block and crushed ice discharging means secured on the upper end of said pivotally supported elevator, said means being arranged with respect to the pivotal support of said elevator that said elevator including the means secured thereon is in approximate balance on its pivotal support and its inclination adjustable by minimum energy, and driving means connecting said elevator and said crusher with said source of power.

ELLISON C. GRAYSON.
VERNE W. BENNER.

CERTIFICATE OF CORRECTION.

Patent No. 2,078,379.            April 27, 1937.

ELLISON C. GRAYSON, ET AL.

It is hereby certified that error appears in the printed specification of the above numbered patent requiring correction as follows: Page 1, first column, line 5, for "to" read into; page 3, second column, line 51, for "another" read other; and page 5, second column, line 24, claim 11, for "end" read and; and that the said Letters Patent should be read with these corrections therein that the same may conform to the record of the case in the Patent Office.

Signed and sealed this 8th day of June, A. D. 1937.

Henry Van Arsdale (Seal)            Acting Commissioner of Patents.

pivotally supported on said chassis, an ice crusher supported on the lower end of said elevator and having a discharge outlet for delivery of crushed ice to the ice conveying mechanism of said elevator, an ice receiving platform supported above said crusher, said platform having an opening therein above the inlet of said crusher and a door for closing said opening, an ice delivery platform pivotally supported intermediate its ends at the upper end of said elevator for tilting toward either side of the apparatus, a slidable delivery chute positioned in transverse guides beneath said delivery platform, said chute being adapted to be extended to either side of the apparatus for directing ice from said delivery platform to the vehicle bunker, and means extending between said source of power on the chassis and the crusher and elevator for operating said crusher and elevator.

9. In mobile apparatus for elevating and discharging block and crushed ice into the icing hatch of a refrigerator vehicle ice bunker, the combination comprising, a mobile chassis and a source of power thereon, an inclined elevator supported on said chassis, an ice crusher supported on the lower end of said elevator, a block ice receiving platform on said crusher having an opening therethrough, said crusher and platform being arranged with respect to said elevator that some of the block ice received on said platform may be guided through said opening into said crusher for crushing and feeding to said elevator, and other block ice received on said platform may be guided thereacross directly onto said elevator, ice discharging means supported on the upper end of said elevator, and driving means connecting said elevator and said crusher with said source of power.

10. In mobile apparatus for elevating and discharging block and crushed ice into the icing hatch of a refrigerator vehicle ice bunker, ice discharging means supported on an elevated portion of said apparatus, said means comprising, a pivotally supported delivery table tiltable toward an icing hatch of a vehicle on either side of said apparatus, a pair of transverse guides supported beneath said tiltable delivery table, a discharge chute slidably arranged in said guides for movement toward either side of said apparatus, and stops secured to said guides engaging said chute when extended to either side of the apparatus to limit such movement while allowing the chute to be inclined downwardly away from said delivery table toward a hatch of a refrigerator vehicle.

11. In mobile apparatus for elevating and discharging block and crushed ice into the icing hatch of a refrigerator vehicle ice bunker, the combination comprising, a mobile chassis and a source of power thereon, an inclined elevator, pivotally supported intermediate its ends on said chassis, block ice receiving end crushing means secured on the lower end of said pivotally supported elevator, block and crushed ice discharging means secured on the upper end of said pivotally supported elevator, said means being arranged with respect to the pivotal support of said elevator that said elevator including the means secured thereon is in approximate balance on its pivotal support and its inclination adjustable by minimum energy, and driving means connecting said elevator and said crusher with said source of power.

ELLISON C. GRAYSON.
VERNE W. BENNER.

CERTIFICATE OF CORRECTION.

Patent No. 2,078,379.            April 27, 1937.

ELLISON C. GRAYSON, ET AL.

It is hereby certified that error appears in the printed specification of the above numbered patent requiring correction as follows: Page 1, first column, line 5, for "to" read into; page 3, second column, line 51, for "another" read other; and page 5, second column, line 24, claim 11, for "end" read and; and that the said Letters Patent should be read with these corrections therein that the same may conform to the record of the case in the Patent Office.

Signed and sealed this 8th day of June, A. D. 1937.

Henry Van Arsdale (Seal)            Acting Commissioner of Patents.

CERTIFICATE OF CORRECTION.

Patent No. 2,078,379.   April 27, 1937.

ELLISON C. GRAYSON, ET AL.

It is hereby certified that error appears in the printed specification of the above numbered patent requiring correction as follows: Page 1, first column, line 5, for "to" read into; page 3, second column, line 51, for "another" read other; and page 5, second column, line 24, claim 11, for "end" read and; and that the said Letters Patent should be read with these corrections therein that the same may conform to the record of the case in the Patent Office.

Signed and sealed this 8th day of June, A. D. 1937.

Henry Van Arsdale (Seal)   Acting Commissioner of Patents.